United States Patent [19]

Drexler

[11] Patent Number: 5,241,165
[45] Date of Patent: Aug. 31, 1993

[54] ERASABLE OPTICAL WALLET-SIZE DATA CARD

[75] Inventor: Jerome Drexler, Los Altos Hills, Calif.

[73] Assignee: Drexler Technology Corporation, Mountain View, Calif.

[21] Appl. No.: 319,457

[22] Filed: Mar. 3, 1989

Related U.S. Application Data

[63] Continuation-in-part of Ser. No. 72,307, Jul. 13, 1987, Pat. No. 4,810,868, which is a continuation-in-part of Ser. No. 763,028, Aug. 6, 1985, Pat. No. 4,680,456, which is a continuation-in-part of Ser. No. 673,573, Nov. 21, 1984, Pat. No. 4,542,288, which is a continuation-in-part of Ser. No. 566,966, Dec. 29, 1983, Pat. No. 4,500,777, which is a continuation-in-part of Ser. No. 492,691, May 11, 1983, abandoned, which is a continuation-in-part of Ser. No. 238,833, Feb. 27, 1981, abandoned.

[51] Int. Cl.⁵ .......................... G06K 19/00; G11B 7/24
[52] U.S. Cl. .................................... 235/488; 235/487; 369/109
[58] Field of Search ............... 235/487, 488; 369/47, 369/109; 346/76 L

[56] References Cited

U.S. PATENT DOCUMENTS

| | | | |
|---|---|---|---|
| 3,530,441 | 9/1970 | Ovshinsky | 340/173 |
| 4,209,804 | 6/1980 | Dil | 358/128.5 |
| 4,269,917 | 5/1981 | Drexler et al. | 430/16 |
| 4,385,372 | 5/1983 | Drexler | 369/109 |
| 4,425,570 | 1/1984 | Bell et al. | 346/135.1 |
| 4,493,887 | 1/1985 | Peeters et al. | 430/275 |
| 4,500,777 | 2/1985 | Drexler | 235/487 |
| 4,527,173 | 7/1985 | Gupta et al. | 346/135.1 |
| 4,542,288 | 9/1985 | Drexler | 235/487 |
| 4,544,181 | 10/1985 | Maurer et al. | 283/74 |
| 4,544,835 | 10/1985 | Drexler | 235/487 |
| 4,656,346 | 4/1987 | Drexler | 235/487 |
| 4,680,460 | 7/1987 | Drexler | 235/488 |
| 4,683,371 | 7/1987 | Drexler | 235/487 |
| 4,719,615 | 1/1988 | Feyrer et al. | 369/284 |
| 4,753,861 | 6/1988 | Tsou et al. | 430/19 |
| 4,757,492 | 7/1988 | Fukushima et al. | 369/100 |
| 4,831,244 | 5/1989 | Slafer et al. | 235/487 |
| 4,870,633 | 9/1989 | Matsushita | 369/47 |
| 4,945,215 | 7/1990 | Fukushima | 235/457 |

OTHER PUBLICATIONS

Bartolini et al., "Review and Analysis of Optical Recording Media", Mar. 4, 1976, all pages.

Primary Examiner—Jeffrey A. Gaffin
Attorney, Agent, or Firm—Schneck & McHugh

[57] ABSTRACT

An erasable optical, wallet-size data card utilizing an erasable recording strip in which laser written data is recorded. The data card also contains permanently stored prerecorded information in the form of surface contours or photographic marks. The prerecorded information is stored either atop of or directly below the erasable recording strip either in a transparent protective layer, a polymer underlayer or a plastic card base. Both sets of data, the laser written and the prerecorded, may be read and viewed simultaneously without interfering with each other. The erasable material used in the erasable recording strip may be magnetooptical material, amorphous-crystalline material or liquid crystal material or material showing a metal-insulator transition.

9 Claims, 3 Drawing Sheets

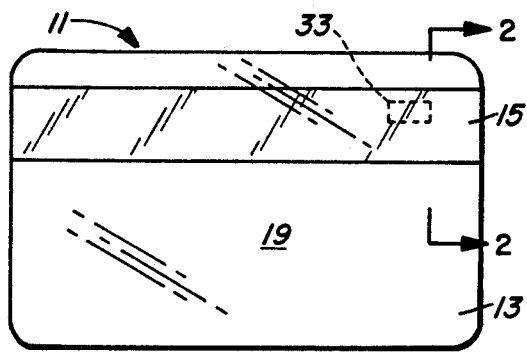
FIG._1.
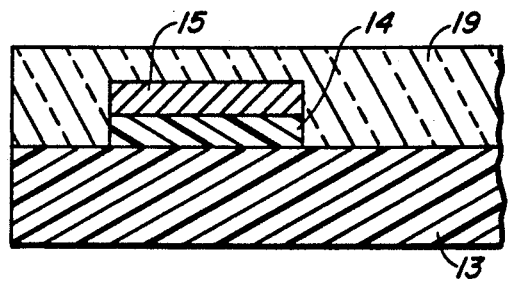
FIG._2A.
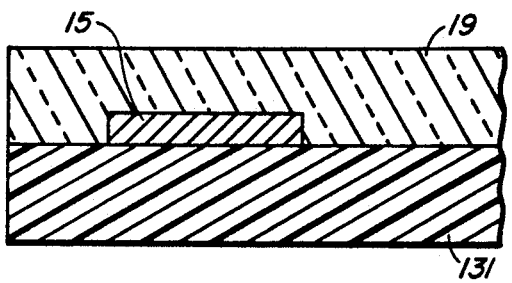
FIG._2B.
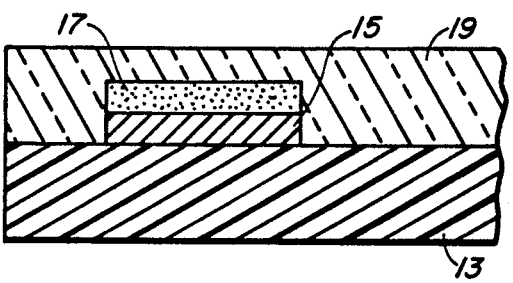
FIG._2C.
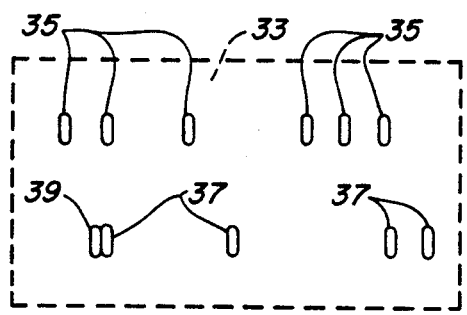
FIG._3A.
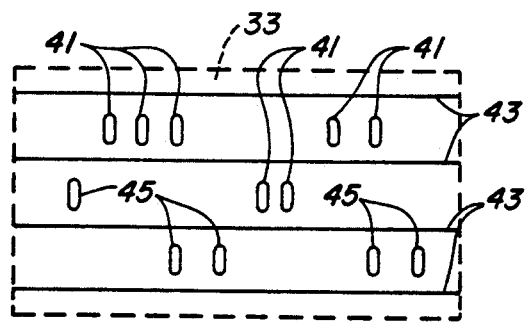
FIG._3B.
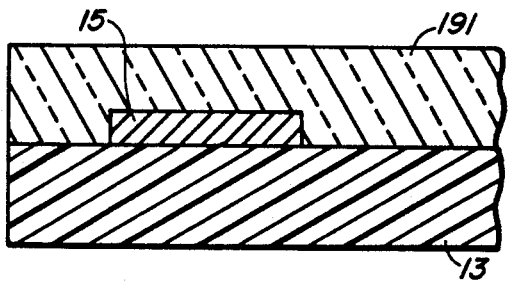
FIG._2D.

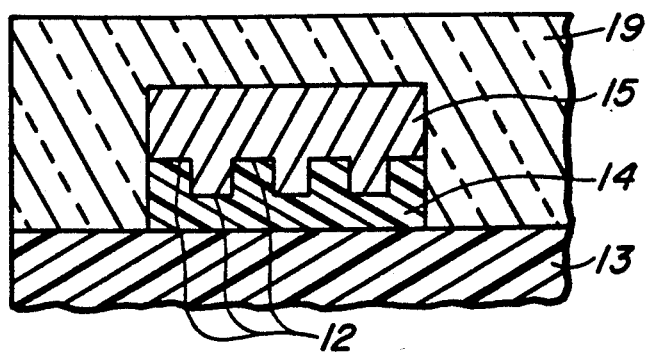
FIG._2E.
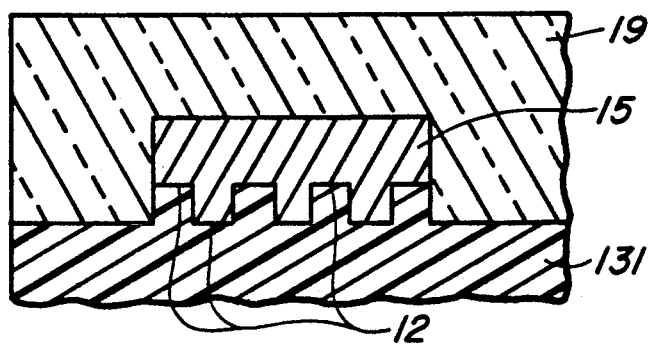
FIG._2F.
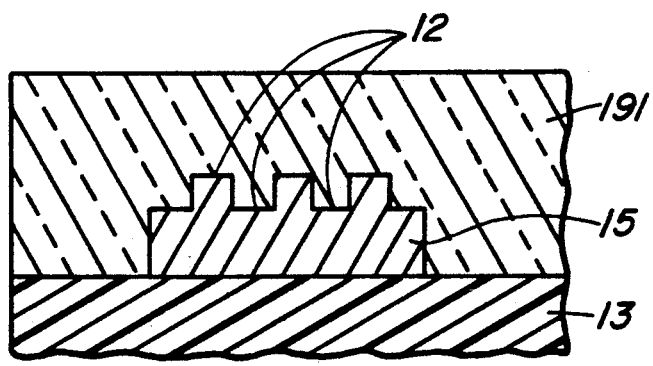
FIG._2G.
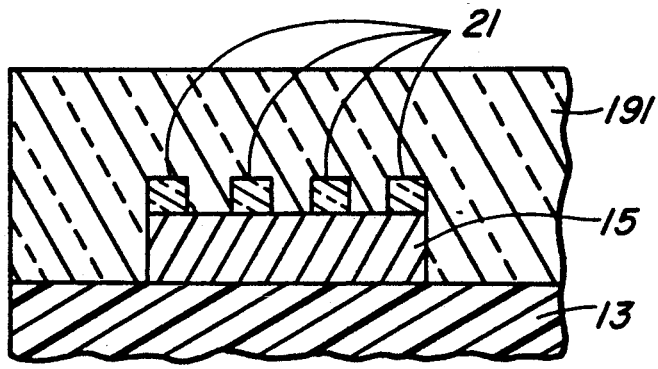
FIG._2H.

ERASABLE OPTICAL WALLET-SIZE DATA CARD

CROSS REFERENCE TO RELATED APPLICATION

This application is a continuation-in-part of prior application Ser. No. 072,307, filed Jul 13, 1987, now U.S. Pat. No. 4,810,868, which was a continuation-in-part of application Ser. No. 763,028, filed Aug. 6, 1985, now U.S. Pat. No. 4,680,456, which was a continuation-in-part of application Ser. No. 673,573, filed Nov. 21, 1984, now U.S. Pat. No. 4,542,288, which is a continuation-in-part of prior application Ser. No. 566,966, filed Dec. 29, 1983, now U.S. Pat. No. 4,500,777, which was a continuation-in-part of prior application Ser. No. 492,691, filed May 11, 1983, now abandoned, which was a continuation-in-part of prior application Ser. No. 238,833, filed Feb. 27, 1981, now abandoned.

DESCRIPTION

1. Technical Field

The invention relates to optical information storage.

2. Background Art

Dil, in U.S. Pat. No. 4,209,804, teaches a reflective information recording structure which contains pre-pressed V-shaped grooves in which data may be recorded by local melting of the reflective metal coating by a laser. The data on the media is read by means of optical phase shift effects. Since the preformed grooves are at an optical phase depth of 95° to 140°, the reading laser must be of the precise wavelength corresponding to the groove depth. The information area has a width of approximately 0.6 microns, so a thick protective substrate, usually 1200 microns deep is used to ensure that one micron surface dust particles are out-of-focus for the read beam.

Such thick protective materials cannot be used for wallet cards which have a total thickness of only 800 microns under ISO (International Standards Organization) standards and further it would be uncomfortable to carry a rigid card in trouser pockets or wallets. It is also impractical to melt large holes since a large lip would be formed around the hole causing a great distortion of the phase shift. Edge transition of the hole is the phase shift which is measured, and since the height of the lip is directly proportional to the square root of the hole diameter, phase shift reading is only practical for small holes. For example, a 25 micron diameter hole creates a lip with one micron height, which is much larger than the wavelength of the reading beam. Thus for large holes and bonded protective materials it is desirable to have a recording/reading structure that does not rely entirely on phase shifts.

Various erasable optical recording media have been developed for use on a rotating disc format. Gupta et al. in U.S. Pat. No. 4,527,173 teach an erasable, reusable recording medium having a heat-deformable optical recording layer with a very thin transparent overcoat. Heating returns the medium to an unrecorded state.

In U.S. Pat. No. 3,530,441, Ovshinsky teaches an erasable recording medium wherein amorphous silicon is locally converted to crystalline silicon with concomitant changes in optical reflectivity.

In U.S. Pat. No. 4,425,570 Bell et al. teach an erasable optical recording medium composed of a metallic granular material in a dielectric matrix. The metal particles are of a type which absorb light at the recording wavelength and reversibly switch from an original state to a second state having different optical properties at a read-out wavelength. An erasing light beam or heat is able to restore the material to its original condition.

Feyrer et al. in U.S. Pat. No. 4,719,615 teach an erasable optical medium in which thermal deformations are formed in a bilayer recording film. The medium may be restored to its original state either thermally or mechanically.

Tsou et al. in U.S. Pat. No. 4,753,861 teach a reversible organic optical recording medium which is thermally convertible between two different crystalline forms. Information is recorded or erased with a laser beam that heats a film of the organic material in a local area to change the crystalline form. Erasing may also be accomplished by melting the film and then quickly cooling it to restore the original crystalline form.

In U.S. Pat. No. 4,757,492, Fukushima et al. disclose an erasable optical medium which is capable of showing a metal-insulator transition. The heating effect of a light beam causes the desired transition. Heat is used to erase and restore the medium for other recordings.

Magnetooptical erasable laser recording materials are also known in the art. For example, see U.S. Pat. No. 4,493,887 to Peeters et al. In these materials, information is read using the Kerr effect. Heat and magnetic fields are used for erasing.

Drexler et al. in U.S. Pat. No. 4,269,917 discloses a laser recording medium which may be photographically prerecorded with permanent information. The pre-recorded information and laser written data are both stored and recorded permanently in the same recording layer.

Drexler in U.S. Pat. No. 4,385,372 teaches an optical recording material in which a reflective layer is coated with a dielectric material having grooves therein. The grooves have one depth for destructive interference of light and another depth for interference and light scattering. The two depths permit two levels of encoding for prerecorded information. User data is laser written in the reflective layer by forming permanent deformations or pits in the reflective layer. Molding and pressing are methods taught by Drexler to form the grooves in an upper dielectric surface. Data recorded in both the reflective layer and dielectric surface layers are permanently stored.

A dual stripe optical card is taught by Drexler in U.S. Pat. No. 4,683,371 in which one strip is an erasable, reflective optical material and the other a non-erasable optical strip having pre-recorded programs or data. Usually, only one strip can be read at a time in a single beam card reader or two separate reading systems would be needed within the card reader for simultaneous reading of both strips.

A disadvantage to having permanently stored user data and prerecorded information in a card format is that the card will eventually become full. It is therefore the object of the present invention to devise a wallet-size plastic data card containing a reusable laser recordable strip and a system for sequential recording transaction data on the data card with a laser where the data on the card may be read optically. It is also an object of the invention to perform related sequential laser recording of transactions and events related to the fields of insurance, personal medical records, personal information, banking and related data records.

DISCLOSURE OF THE INVENTION

These objects were met with a wallet-size sealed plastic card only 800 microns thick containing a dual layer recording medium comprising an erasable laser recordable strip or layer and a permanent, prerecorded information storage layer. The permanently stored, prerecorded information layer is maintained either directly beneath or above the erasable recording strip in the card. For example, a polymer underlayer or plastic card base may be permanently surface molded with contours or relief patterns that represent prerecorded information and are read through the erasable recording layer.

Alternatively, relief patterns may be formed in the surface of a transparent protective layer which covers the erasable recording strip. In another embodiment, prerecorded information is permanently stored on photographic film which coats the erasable recording layer. The prerecorded information may also be stored as a pre-polarized pattern which coats the erasable recording layer. Reading data in the present invention relies on optical contrast ratios from laser recorded user data and prerecorded information or phase related reading of prerecorded information.

There are two basic configurations for the present invention. In one configuration, an erasable recording layer is disposed over a layer containing permanently stored prerecorded information. Typically, relief patterns will represent the prerecorded information in this configuration. In the other configuration, the prerecorded information is disposed over the erasable recording layer. The prerecorded information may, in this case, be stored as relief patterns or photographic marks. The card of the first configuration is formed by first prerecording information on either a polymer underlayer or a plastic card base by surface molding, covering the underlayer or card base with an erasable recording layer, and bonding a protective, transparent material over the recording layer. The card of the second configuration is formed by either prerecording information by surface molding a transparent layer and disposing the protective layer over an erasable recording layer, coating a transparent protective layer with photographic material and prerecording information in the photographic material, and then disposing the protective layer over an erasable recording layer, or disposing a pre-polarized pattern over the recording layer.

The erasable recording layer or strip may be made of crystalline material which is thermally convertible between two forms having distinct optical characteristics; magnetooptical material which is written magnetically, but read optically by detecting a shift in the angle of polarized light; or liquid crystal material which has two states of different optical scattering; or material exhibiting a metal-insulation transition with changes in optical characteristics.

One of the chief advantages of the present invention is that the prerecorded information is stored in a permanent manner, while recording space is made available in the erasable recording layer. This means that when data is erased in the erasable recording layer, the prerecorded information remains unchanged. Therefore, prerecorded servo tracks, position and timing marks, identification information, and specific formatting may be continuously accessible without the threat of erasure. Another advantage is the high information capacity of laser recording media strips which enables a data card of the present invention to store the equivalent of scores of pages of text, more than ample for most applications. Thus, the data card of the present invention is suitable for recording data involving financial transactions, insurance transactions, medical information and events, and personal information and identification. It is also capable of being erased and rewritten.

BRIEF DESCRIPTION OF THE DRAWINGS

FIG. 1 is a plan view of one side of a data card in accord with the present invention.

FIGS. 2A-2D are partial side sectional views of embodiments in accord with the present invention taken along lines 2—2 in FIG. 1.

FIG. 2E is a detailed view of the embodiment of FIG. 2A.

FIG. 2F is a detailed view of the embodiment of FIG. 2B.

FIG. 2G is a detailed view of the embodiment of FIG. 2D.

FIG. 2H is a detailed partial side sectional view of an additional embodiment in accord with the present invention.

FIGS. 3A and 3B show in detail laser and prerecorded writing on a portion of the recording strip illustrated by dashed lines in FIG. 1.

BEST MODE FOR CARRYING OUT THE INVENTION

Figure 4:
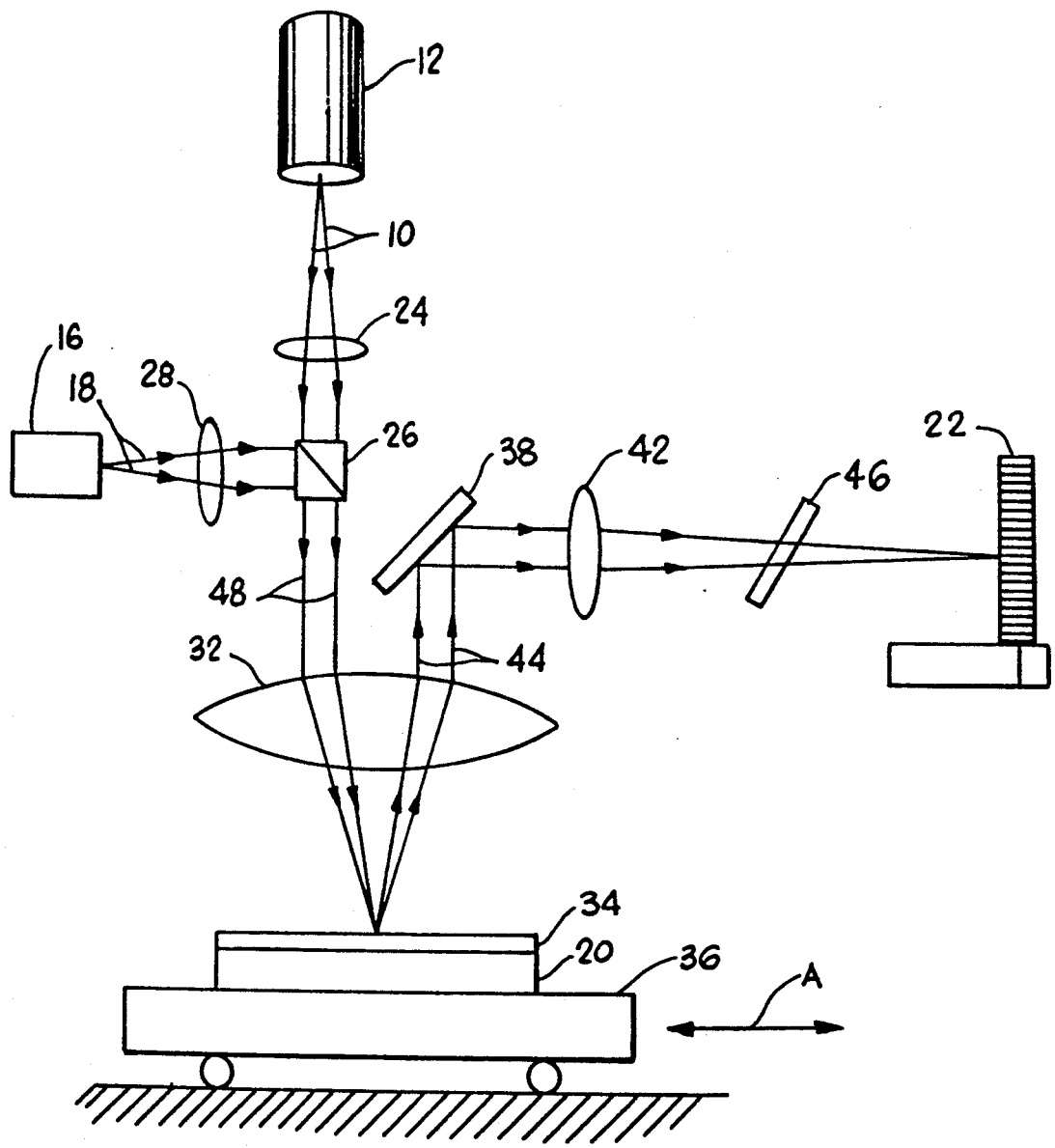
FIG. 4 is a plan view of an apparatus for reading and writing on the optical recording media strip illustrated in FIG. 1.

With reference to FIG. 1, a data card 11 is illustrated having a size common to most credit cards. The width dimension of such a card is approximately 54 mm and the length dimension is approximately 85 mm. These dimensions are not critical, but preferred because such a size easily fits into a wallet and has historically been adopted as a convenient size for automatic teller machines and the like. The card's base 13 is a dielectric, usually a plastic material such as polyvinyl chloride or similar material. Polycarbonate plastic is preferred. The surface finish of the base should have low specular reflectivity, preferably less than 10%. The base may also be transparent. A planar surface of base 13 carries recording strip 15. The recording strip is typically 16 or 35 millimeters wide and extends the length of the card. Alternatively, the strip may have other sizes and orientations, and may extend the full width and length of the card. The strip is relatively thin, approximately 100-500 microns, although this is not critical. A transparent protective layer 19 covers the recording strip 15, and may be made of plastic, preferably polycarbonate, or a transparent lacquer.

The opposite side of base 13 may have user identification indicia embossed on the surface of the card. Other indicia such as card expiration data, card number and the like may be optionally provided.

The relative thickness of the recording layers is greatly exaggerated in FIGS. 2A-2D. The erasable recording strip 15, shown in FIGS. 2A-2D, as well as FIG. 1, may be any suitable reusable data recording material readable with a laser. One class of such materials are magnetooptical recording media of the type described in U.S. Pat. No. 4,670,353 to Sakurai. The described materials are terbium-iron-cobalt amorphous films having a thickness of about 300 Å on a transparent substrate or base. This material is written magnetically, but read optically with polarized light. In use, the material surface is uniformly magnetized. A writing beam heats spots to near material melting temperature where magnetization is reversed with a local magnetic field. A lower power beam is used for reading the spots which reflect and scatter light differently than the surrounding field.

A second erasable recording material consists of liquid crystal film of the type described in U.S. Pat. No. 4,405,993 to Kahn et al. Laser writing is accomplished by locally heating liquid crystal material with a pulsed optical beam to create radiation scattering defects forming a desired bit pattern. By subsequently reheating the local defects, it is possible to recrystallize the material, thereby erasing previously written spots.

A third type of erasable laser recording material is amorphous to crystalline transition material of the type described in U.S. Pat. No. 4,576,895 to Barton et al. or U.S. Pat. No. 4,753,861 to Tsou et al. In this type of material, heating above a critical temperature and rapid cooling of the material causes a reversible transition in crystal structure. Erasing is accomplished by reheating and cooling.

A fourth material is one in which a metal-insulator transition takes place when heated by a light source. The material comprises a thin film in which fine grains of material capable of showing a metal-insulator transition are dispersed. Recording of information utilizes changes in optical characteristics due to plasma resonance absorption by the fine grains dispersed in the thin film. An example of this material is disclosed in U.S. Pat. No. 4,757,492 to Fikushima et al.

The erasable recording material should also be capable of recording at speeds of at least several thousand bits/sec. This generally precludes the use of materials that require long heating times or that rely on slow chemical reactions in the presence of heat, which may permit recording of only a few bits/sec. Data is typically recorded using a laser that forms spots in the surrounding field of the recording layer itself, thereby altering an optical characteristic of the data spot from the surrounding field. Data is read by detecting the optical contrast between the surrounding field of unrecorded areas and the recorded spots.

Referring in particular to FIGS. 2A and 2E, polymer underlayer 14 is disposed on a major surface of card base 13. Permanent patterns are made in the polymer underlayer for prerecording non-erasable information, such as servo tracks, control and timing indicia, and fixed data. Typically, surface relief patterns 12 are formed in polymer underlayer 14 with a characteristic maximum height differential between the reliefs and the surface. The relief patterns 12 may be formed by surface molding. Polymer underlayer 14 may be a photopolymer, such as photoresist. The erasable recording strip 15 is disposed directly over and in intimate contact with underlayer 14. The strip may be applied to the card by any convenient method which follows the contours of the underlying material such as vapor deposition. Metallic recording strips or areas may be vapor deposited or sputtered onto the polymer underlayer so long as the prerecorded underlayer 14 can be read from the strip 15 such as by reading phase-shifts.

FIGS. 2B and 2F illustrate a somewhat simplified embodiment from that which is shown in FIGS. 2A and 2E. Here a card base 131 contains prerecorded information in the form of relief patterns 12. Rather than surface molding the polymer underlayer 14, as discussed in relation to FIG. 2E, the card base 131 itself may be surface molded. Thereafter, erasable recording strip 15 is disposed directly over the card base surface containing the prerecorded information as described previously. Transparent protective layer 19 is then bonded to the card base 131 so as to cover erasable recording strip 15.

Alternative embodiments of the present invention are illustrated in FIGS. 2C, 2D and 2G, wherein prerecorded information is stored relatively above the erasable recording strip 15. That is to say that a reading beam is first directed through a surface or layer containing the prerecorded information before reaching the erasable recording strip 15. In this case the prerecorded information may be read by either optical contrast ratios or phase related shifts.

With specific reference to FIG. 2C, transparent protective layer 19 is either coated with photosensitive material which is then exposed and developed to create prerecorded information in a developed film layer 17 or a previously developed film layer 17 is directly bonded to either the transparent protective layer 19 or the erasable recording strip 15. In this embodiment the prerecorded information stored in the film layer 17 may be read by detecting the optical reflective contrast between the underlying erasable recording strip 15 and the prerecorded information or marks in the film layer 17. The prerecorded information may be dark marks with the remaining area of the film layer being transmissive or the marks may be transmissive with the remaining area being opaque. The film layer may be selected from the many high resolution black and white films that are commercially available for spectroscopic and holographic applications, such as Kodak spectroscopic film type 649, or Kodak holographic film type SO 173 or Agfa Gaevert type 8E56HD. As shown, film layer 17 is in direct contact with erasable recording strip 15. However, a transparent sublayer may be placed between the film layer and the recording strip for better adherence. In forming this embodiment, the erasable recording strip 15 is disposed on a surface of card base 13 and then transparent protective layer 19, to which film layer 17 is adhered, is bonded to the card base so as to cover the card base and to position the film layer over the erasable recording strip. Alternatively, the erasable recording strip 15 may be disposed onto the film layer 17 and then the combination of the transparent protective layer 19, film layer 17 and recording strip 15 be bonded to the card base 13.

Instead of creating prerecorded information from a developed photographic film layer, a layer 21 of polarizing material may be formed on the optical storage layer 15, as seen in FIG. 2H. The layer 21 is then selectively etched to form track guides, start and stop marks, track numbers, data and other prerecorded nonerasable indicia. The polarizing layer 21 is oriented so that it is cross-polarized with respect to the incident beam polarization. If the erasable recording layer 15 is a magneto-optical material that relies on the Kerr effect for data storage, the incident beam will typically be polarized to leave a dark field with reflective data spots, though, of course, the reverse could also be chosen. The polarizing layer 21 is then oriented with a polarization perpendicular to that direction. If other types of erasable recording layers 15 are used, the polarization direction of layer 21 with respect to the recording layer 15 is not critical, only its direction with respect to an incident beam. Etching removes all but the indicia, leaving the surface of the recording layer 15 unobstructed. In addition to being viewable by means of optical contrast of polarized light, the polarizing layer 21 is also phase readable due to its etched contours or relief patterns.

Turning now to FIGS. 2D and 2G, an embodiment is illustrated as having a transparent protective layer 191, an erasable recording strip 15 and a card base 13. In making this embodiment, relief patterns 12 representing prerecorded information are formed in a surface of the transparent protective layer 191. To this surface, the erasable recording strip 15 is deposited so that the recording strip follows the contours of the relief patterns 12. The transparent protective layer 191 with the deposited erasable recording strip 15 is then bonded to the card base 13.

With reference to FIG. 3A, a magnified view of laser writing on an erasable laser recording material strip 15 may be seen. The dashed line 33, corresponds to the dashed line 33 in FIG. 1. The oblong spots 35 are aligned in a path and have generally similar dimensions. The spots are generally circular or oval in shape with the axis of the oval perpendicular to the lengthwise dimension of the strip. A second group of spots 37 is shown aligned in a second path. The spots 37 have similar dimensions to the spots 35. The spacing between paths is not critical, except that the optics of the readback system should be able to easily distinguish between paths.

Presently, in optical disk technology, tracks which are separated by only a few microns may be resolved. The spacing and pattern of the spots along each path is selected for easy decoding. For example, oval spots of the type shown can be clustered and spaced in accord with self-clocking bar codes. If variations in the dimensions of a spot are required, such dimensions can be achieved by clustering spots, such as the double spot 39. Such variations are used in the ETAB bar code which is described in U.S. Pat. No. 4,245,152. While the American Banker's Association has not yet adopted any particular code, the strip material is such that many machine and eye readable codes can be accommodated. Some optical codes such as the Universal Product Code are both machine and eye readable. Such codes could also be accommodated, although a great deal more laser writing would be required than with circular or oval spots, and a much lower information density would be achieved. The spots illustrated in FIGS. 3A and 3B typically have recommended sizes of approximately 5 microns by 20 microns, or 2 microns by 8 microns or circular spots 3 microns to 10 microns in diameter. Generally, the smallest dimension of a spot should be less than 50 microns. In the preferred embodiment the largest dimension would also be less than 50 microns. Of course, to offset lower densities from larger spots, the size of the strip 15 could be expanded to the point where it covers a large extent of the card. In FIG. 1, the laser recording strip 15 could completely cover a single side of the card. A minimum information capacity of 250,000 bits is indicated and a storage capacity of over one million bits is preferable.

Referring to FIG. 3B, data spots 41 are laser written user data written on erasable recording strip 15. Data spots 45 are prerecorded data which are permanently recorded and are not erased when the erasable strip 15 is erased. The data spots 41 and 45 are aligned in data tracks delimited by servo track lines 43. These lines are also prerecorded and remain on the card permanently. Other information may be prerecorded, such as data track beginning and end marks, timing marks and servo control indicia. This enables a card to be permanently formatted, or to permanently contain identification information and other useful information. Reading the laser written and prerecorded data may be done simultaneously, since the prerecorded information does not interfere with reading the laser written data and vice versa. When the erasable recording strip is placed atop the prerecorded information, then the strip reveals the prerecorded information. When the prerecorded information is stored atop the erasable recording strip, then laser written data in the strip is revealed through the prerecorded information.

In FIG. 4, a side view of the lengthwise dimension of a card 20 is shown. The card is usually received in a movable holder 36 which brings the card into a beam trajectory of a laser 12 capable of emitting a modulated laser beam. A second light source 16 emits a second beam 18. Optical elements direct beams 10 and 18 to card 20, and at least one detector 22 reads data on card 20.

Laser 12 is used only for writing data spots on card 20 and during data reading is kept below the threshold for writing on the medium. Beam 10 should, when writing, deliver sufficient laser pulse energy to the surface of the recording material to create spots. Typically, 5-20 milliwatts is required, depending on the recording material. A 20 milliwatt semiconductor laser, focused to a five micron beam size, records at temperatures of about 200° C. and is capable of creating spots in less than 25 microseconds. Other laser beams, focused to one to ten micron beam diameters, are also capable of recording spots on optical storage media. The wavelength of the laser should be compatible with the recording material.

Second light source 16 is preferably a light emitting diode (LED) or semiconductor laser, and is used for reading data spots on card 20 and for tracking, clocking and focusing. LED 16 emits low intensity beam 18 during both reading and writing. Second light source 16 may also be a defocused laser.

Laser beam 10 is directed through a lens 24 to a beamsplitter 26. Beam 18 from LED 16 is directed through a lens 28 to beamsplitter 26. Beams 10 and 18 entering beamsplitter 26 emerge as a combined beam sharing a slightly displaced optical axis 48. Combined beam on axis 48, which beam is made up of low intensity beam 18 and laser beam 10 at high power during data writing and low or zero power during data reading, is directed through a focusing lens 32 onto card 20. Card 20 is typically provided with a transparent scratch resistant protective coating 34 disposed on the data storage medium on the card. Lens 32 has a focal length so as to bring laser beam 10 to a narrow spot on the order of one to ten micrometers in diameter on card 20. Lens 32 typically has a three to four millimeter focal length. Beam 18 does not focus to a narrow spot but rather illuminates a substantially larger area of the medium on card 20 than beam 10. Typically, beam 18 illuminates an area ranging from a 10 micrometer diameter up to a 60 micrometer diameter. Beam 18 may be elliptical.

Card 20 is supported on a platform 36 movable in a direction indicated by arrow A. Motion of platform 36 provides course scanning in a longitudinal direction along data tracks read through the recording strip on card 20. The system is movable in a direction in and out of the page for course scanning in a lateral direction across data tracks. Fine scanning may be provided by moving one or more optical elements in the system, such as lens 32.

Light illuminating the recording strip on card 20 is reflected from the strip and scattered or absorbed by data spots or prerecorded information on the strip. Light scattered or absorbed from the spots contrasts with the light reflected from the surrounding field where no spots or surface contours exist. The light is then directed to at least one detector 22 by lens 32, a mirror 38, and a lens 42. Lens 32 is shown off-center with respect to optical path 38 so that reflected light returns through lens 32 along a separate optical path 44. This allows a non-polarization sensitive tracking and focusing system to be used to thereby reduce the cost of the medium.

The focal length of lens 42 is determined by the size and configuration of detector 22, and vice versa. The spot on the media should be imaged onto detector elements of detector 22. The magnification of a spot is determined by the focal lengths of lenses 32 and 42. Preferably, the focal length of lens 42 is on the order of 10 mm, but lenses have been used with a focal length as long as 360 mm. In that case, a plurality of turning mirrors, represented by mirror 46, is generally provided to fold the optical path 44 into a compact structure. No such turning mirrors 46 are required for lenses 42 having a focal length of about 10 mm.

The present invention has the advantages that an erasable optical data card may be permanently formatted with prerecorded information. Moreover, certain information such as prerecorded identification information remains on the card and cannot be accidentally erased.

I claim:

1. In an optical data card of the type having a wallet-size plastic card base with opposed planar surfaces and an erasable optical recording layer disposed over at least a portion of a planar surface of the card base, the improvement comprising:
   a generally transparent protective layer disposed over the erasable optical recording layer, the protective layer having opposed surfaces one of which is coated with developed photographic film, the developed photographic film being in intimate contact with the erasable optical recording layer and overlying the erasable optical recording layer, the photographically formed layer containing prerecorded information created in a permanent manner therein, the prerecorded information being in an interference-free relation with erasable data in the underlying erasable optical recording layer and contrasting in observed optical intensity with unrecorded areas of the underlying erasable recording layer.

2. The optical data card of claim 1 wherein said erasable optical recording layer comprises one of magnetooptical material, liquid crystal material, film capable of amorphous to crystalline transitions, and film showing a metal-insulator transition.

3. In an optical data card of the type having a wallet-size plastic card base having opposed planar surfaces and an erasable optical recording layer disposed over at least a portion of a planar surface of the card base, the improvement comprising:
   a transparent protective layer having opposed surfaces, one of the surfaces of the protective layer being coated with photosensitive material, the protective layer being disposed over the erasable optical recording layer such that the photosensitive material is in intimate contact with and overlies the erasable optical recording layer whereafter said photosensitive material is exposed and developed in situ to create permanent information in the photosensitive material, the permanent information being in an inteference-free relation with erasable data in the underlying erasable recording layer and contrasting in observed optical intensity with unrecorded areas of the underlying erasable optical recording layer.

4. The optical data card of claim 3 wherein said erasable optical recording layer comprises one of magnetooptical material, liquid crystal material, film capable of amorphous to crystalline transitions, and film showing a metal-insulator transition.

5. In an optical data card of the type having a wallet-size plastic card base, having opposed planar surfaces, and an erasable optical recording layer disposed over at least a portion of a planar surface of the card base, the improvement comprising,
   a generally transparent protective layer disposed over the erasable optical recording layer, the protective layer having opposed surfaces one of which has a polarizing material layer formed thereon, the polarizing material layer being in intimate contact with the erasable optical recording layer and overlying the erasable optical recording layer, the polarizing material layer being selectively etched to create permanent prerecorded information thereon, said prerecorded information being in an interference-free relation with erasable data in the underlying erasable optical recording layer and contrasting in both observed optical intensity and phase in cross-polarized light with unrecorded areas of the underlying erasable recording layer.

6. The optical data card of claim 5 wherein said erasable optical recording layer is selected from the group consisting of magnetooptical material, liquid crystal material, film capable of amorphous to crystalline transitions, and film capable of metal-insulator transitions.

7. A method for making an optical data card comprising,
   disposing an erasable optical recording layer over at least a portion of a planar surface of a card base,
   coating a portion of a surface of a transparent protective layer with photosensitive material,
   exposing the photosensitive material,
   developing the exposed photosensitive material to create in a permanent manner prerecorded information, the developed photosensitive material no longer being photosensitive, and
   covering the erasable optical recording layer with the protective layer such that the developed photosensitive material is in intimate contact with and overlies the erasable optical recording layer, the prerecorded information being in interference-free relation with erasable data in the underlying erasable optical recording layer and contrasting in observed optical intensity with unrecorded areas of the underlying erasable recording layer.

8. A method for making an optical data card comprising,
   disposing an erasable optical recording layer over at least a portion of a planar surface of a card base,
   coating a portion of a surface of a transparent protective layer with photosensitive material, covering the erasable optical recording layer with the protective layer such that the photosensitive material is in intimate contact with and overlies the erasable optical recording layer, exposing the photosensitive material, and developing the exposed photosensitive material in situ to create in a permanent manner a pattern representing prerecorded information, the prerecorded information being in interference-free relation with erasable data in the underlying erasable optical recording layer and contrasting in observed optical intensity with unrecorded areas of the underlying erasable recording layer.

9. A method of making an optical data card comprising, disposing an erasable optical recording layer over at least a portion of a planar surface of a card base, coating a surface of a transparent protective layer with a polarizing material layer, selectively etching said polarizing material layer to create permanent prerecorded information, and covering the erasable optical recording layer with the protective layer such that the etched polarizing material layer is in intimate contact with and overlies the erasable optical recording layer, the prerecorded information being in interference-free relation with erasable data in the underlying erasable optical recording layer and contrasting in both observed optical intensity and phase in cross-polarized light with unrecorded areas of the underlying erasable recording layer.

* * * * *